US006834781B1

(12) United States Patent
Mueller

(10) Patent No.: US 6,834,781 B1
(45) Date of Patent: Dec. 28, 2004

(54) GREASE GUN WITH AIR BLEED VALVE

(76) Inventor: John J. Mueller, 22186 State Highway 4, Paynesville, MN (US) 56362

( * ) Notice: Subject to any disclaimer, the term of this patent is extended or adjusted under 35 U.S.C. 154(b) by 0 days.

(21) Appl. No.: 09/810,355

(22) Filed: Mar. 19, 2001

Related U.S. Application Data

(60) Provisional application No. 60/200,925, filed on May 1, 2000.

(51) Int. Cl.[7] ................................................ G01F 11/00
(52) U.S. Cl. ...................................................... 222/262
(58) Field of Search ............................. 222/79, 80, 87, 222/262, 326, 340

(56) References Cited

U.S. PATENT DOCUMENTS

| 1,686,309 | A | * | 10/1928 | Zabriskie ..................... 222/256 |
| 1,757,736 | A | * | 5/1930 | Pritchard ..................... 417/490 |
| 2,174,421 | A | * | 9/1939 | Krannak ...................... 222/80 |
| 2,259,857 | A | | 10/1941 | Ostendorf |
| 2,505,839 | A | | 5/1950 | Scovell |
| 2,928,574 | A | | 3/1960 | Wagner |
| 3,807,606 | A | * | 4/1974 | Foerst et al. ................. 222/262 |
| 4,113,151 | A | * | 9/1978 | Brown et al. ................ 222/326 |
| 4,274,561 | A | * | 6/1981 | Andersson ................... 222/340 |
| 5,779,105 | A | | 7/1998 | Brown et al. |
| 6,123,229 | A | * | 9/2000 | Barish .......................... 222/79 |

FOREIGN PATENT DOCUMENTS

AU              127433          4/1948

* cited by examiner

Primary Examiner—Michael Mar
Assistant Examiner—Thach H. Bui
(74) Attorney, Agent, or Firm—Richard O. Bartz

(57) ABSTRACT

An air operated grease gun has an air bleed valve comprising a threaded stem with a longitudinal groove operable to allow air to bleed from a grease pumping chamber and a grease supply passage. Grease from a cartridge flows through the grease supply passage into the pumping chamber when air is bled from the gun whereby a plunger reciprocating in the grease pumping chamber pumps grease past a check valve into a grease dispensing tube.

20 Claims, 5 Drawing Sheets

GREASE GUN WITH AIR BLEED VALVE

CROSS REFERENCE TO RELATED APPLICATION

This application claims the priority benefit of U.S. Provisional Patent Application Ser. No. 60/200,925 filed May 1, 2000.

FIELD OF THE INVENTION

The invention is in the art of power operated hydraulic fluid and grease dispensers, and in particular to a grease gun having a reciprocating plunger driven with a power unit to pump grease into a grease dispenser.

BACKGROUND OF THE INVENTION

Grease guns having reciprocating plungers operated with power units, such as pistons drive by air and hydraulic fluid pressure or electric motors, to pump grease through a grease dispenser, such as a tube and fitting are common use. These grease guns have tubular members releasably connected to the bases of the guns that accommodate cartridges containing grease which is forced into pumping changers. Reciprocating plungers are moved with power units relative to the pumping chambers to force grease through the passages and check valves into the tubes and fittings. When air is trapped in the pumping chambers, plungers do not pump grease. Air bleed valves on the bases of the grease guns are used to bleed air from the tubular members to eliminate an air lock in the upper ends of the tubular members. These air bleed valves do not bleed air from the pumping chambers and thus do not solve the problem of removing air trapped in the pumping chambers and allow grease to flow into the pumping chamber. E. H. Scovell in U.S. Pat. No. 2,505,839 describes an air operated grease gun having a plunger 1 that reciprocates in a pumping chamber to move grease past a check valve 21 through a nozzle 23. A screw type air valve 24 located on nozzle 23 downstream from the check valve 21 is used to allow air to be bled from the nozzle. The check valve 21 prevents air from flowing out of the pumping chamber and does not solve the problem of bleeding air from the pumping chamber.

SUMMARY OF THE INVENTION

The invention related to an air operated grease gun having an air bleed valve operable to allow air to bleed from the pumping chamber of the grease gun enabling a reciprocating plunger to pump grease. The air bleed valve prevents air lock in the pumping chamber between a check valve and the grease pumping chamber that accommodates the plunger. The air bleed valve is an effective low-cost one-piece member that overcomes the air lock problem of power operated grease guns.

The grease gun has a body having a cylindrical pumping chamber and a grease supply passage intersecting the chamber. A power unit mounted on the body has a plunger that reciprocates in the pumping chamber to pump grease through the pumping chamber and a check valve into a grease dispenser. An air bleed valve aligned with the grease supply passage is manually operable to open the air bleed valve to allow air to flow out of the pumping chamber, passage and grease contain er retained on the body with a tube. The air bleed valve has a threaded stem located in a threaded hole in the body. At least one linear groove in the side of stem allows air to bleed out of pumping chamber when the valve is turned to the open position. Grease replaces air in the pumping chamber and the passage so that the plunger reciprocates in pumping chamber to pump grease through the pumping chamber. A head on the stem engages the body when the stem is turned down to the closed position. The stem does not extend into the pumping chamber. An alternative air bleed valve has a threaded stem turned into a threaded bore in the body in axial alignment with the passage open to the pumping chamber. The stem has a plurality of linear grooves extending about one-half the length of the stem. An annular seat assembly surrounding stem below as head on the stem is held in sealing engagement with the body. The seal assembly has an O-ring and washer with outwardly directed fingers that inhibit rotation of the O-ring during opening and closing of the air bleed valve. When the stem is turned to the open position linear side grooves are open to atmosphere thereby allowing air to bleed from the pumping chamber to atmosphere. Grease replaces the air in the pumping chamber. When the air is bled from the pumping chamber, the stem is turned down to close the air bleed valve thereby preventing grease from flowing through the air bleed valve and air from flowing into the pumping chamber. Operation of the power unit reciprocates the plunger which pumps grease through the pumping chamber past the check valve into the grease dispenser.

DETAILED DESCRIPTION OF THE PREFERRED EMBODIMENTS

Figure 1:
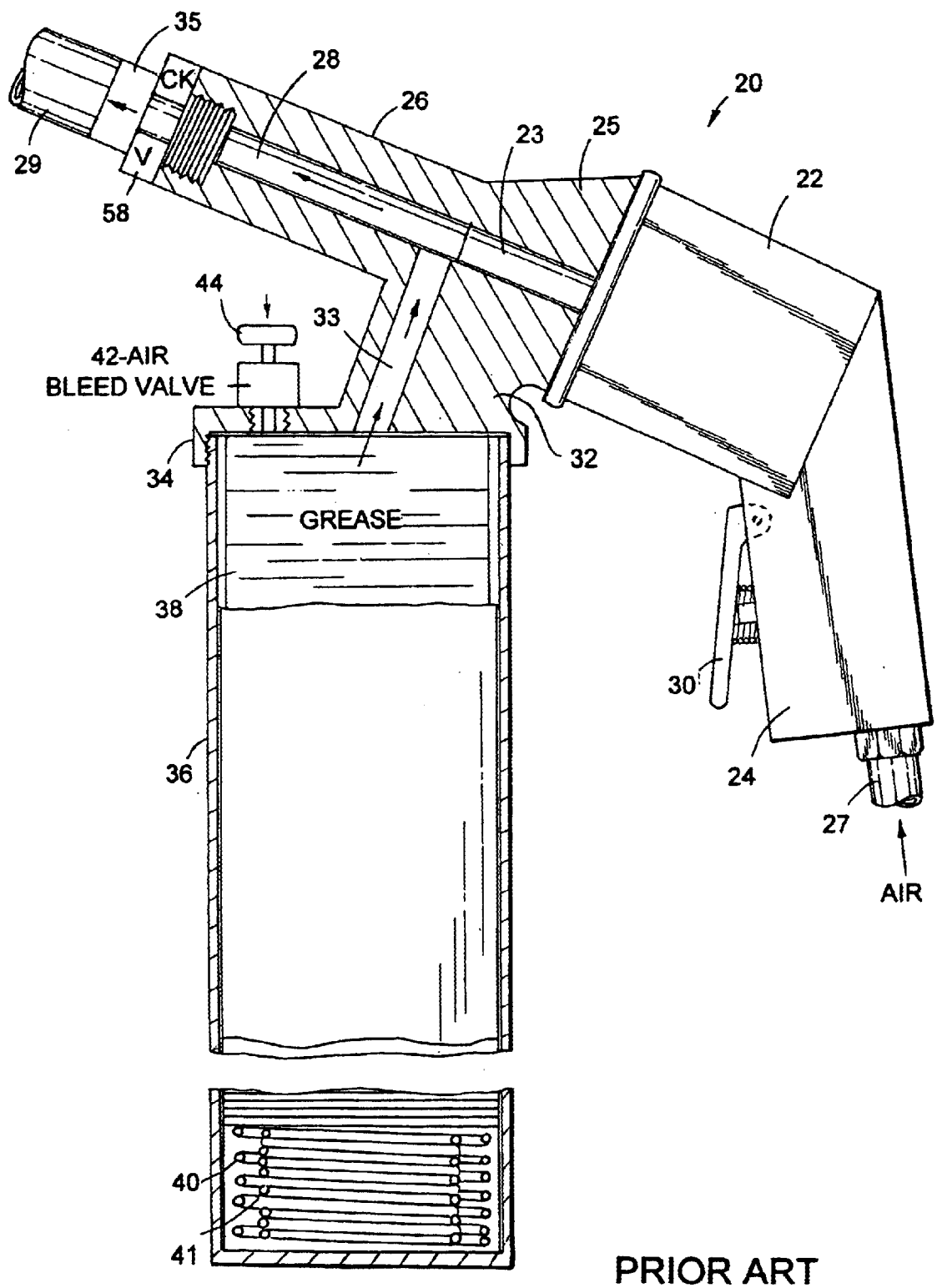
FIG. 1 is a prior art air operated grease gun, partly sectioned, equipped with an air bleed valve for bleeding air for a tube accommodating a grease cartridge.

A prior art air operated grease gun 20, shown in FIG. 1, has a power unit including cylinder 22 accommodating a piston or diaphragm operable to reciprocate a plunger 23 to pump grease through a check valve 35 into a flexible tube 29. A connector 58 having a one-way check valve 35 connects tube 29 to a barrel 26. A grease fitting (not shown) is attached to the remote end of tube 29. A downwardly directed hand grip 24 secured to cylinder 22 allows a person to manually hold the grease gun. An air hose 27 connected to grip 24 delivers air under pressure to cylinder 22. A trigger 30 on grip 24 functions to operate a valve to control the flow of air to cylinder 22. An example of an air operated grease gun is disclosed by C. B. Brown and C. S. Post in U.S. Pat. No. 5,779,105. Other types of power units, such as a hydraulic motor, an electric motor, or hand operated lever, can be used to reciprocate plunger 23 to pump grease.

Cylinder 22 is connected to a body 25 having a barrel 26 and base or extension 32. Body 25 and barrel 26 have a common longitudinal passage or pumping chamber 28. The inner end of passage 28 accommodates a cylindrical plunger 23 operatively connected to the piston which reciprocates plunger 23 to pump grease through passage 28 and check valve 35 into tube 29. Body 25 has a grease supply passage 33 open to passage 28 in front of plunger 23. The bottom of base 32 has an annular flange 34 with internal threads. A grease tube 36 is attached to flange 34. Coil springs 40 and 41 positioned in tube 36 to force grease 38 out of a tubular container into passages 33 and 26. The use of two coil springs 40 and 41 acting on the bottom of the grease container increases the pressure applied to the grease 38 in cold and adverse environmental conditions.

When air is in the upper end of tube 38 grease will not flow into passage 33 and passage 28. Movement of plunger 23 in passage 28 will not pump grease until the air is removed. An air bleed valve 42 mounted on the bottom of base 32 has an actuator 44 which is manually moved to an open position to allow air to bleed from the tube chamber. Actuator 44 must be depressed to open the valve 42. Air and grease flow out of the open valve 42. The grease must be cleaned up. The valve 42 does not bleed air from passages 28 and 33. Air in passage 33 creates an air lock which inhibits the flow of grease into passage 28. Without grease in passage 28 plunger 23 does not pump grease. The air bleed valve of the invention eliminates air lock conditions in passages 28 and 33 so that movement of plunger 23 pumps grease through passage 28 and check valve 35 into tube 29.

Figure 2:
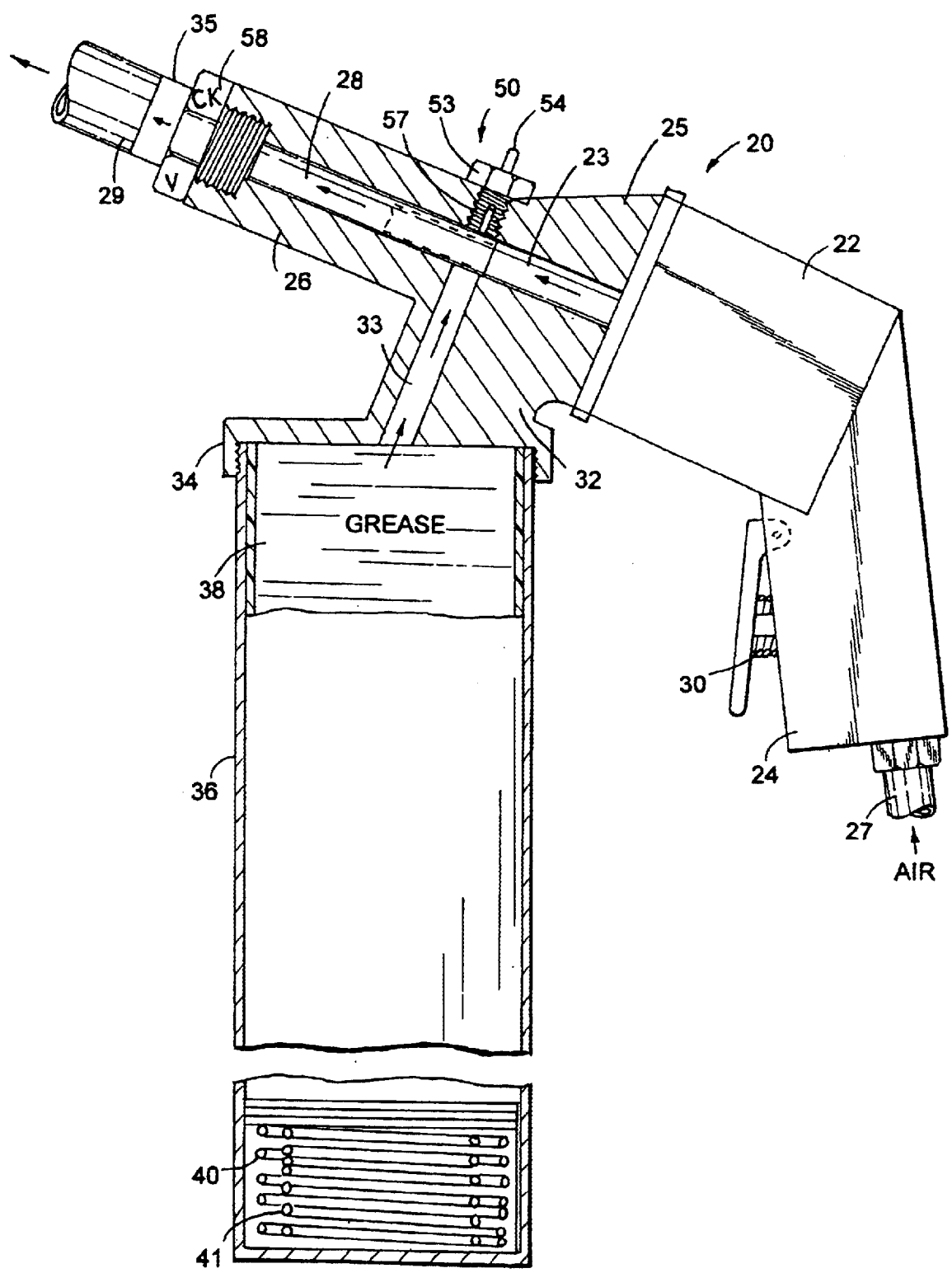
FIG. 2 is an air operated grease gun, partly sectioned, equipped with an air bleed valve of the invention.
Figure 3:
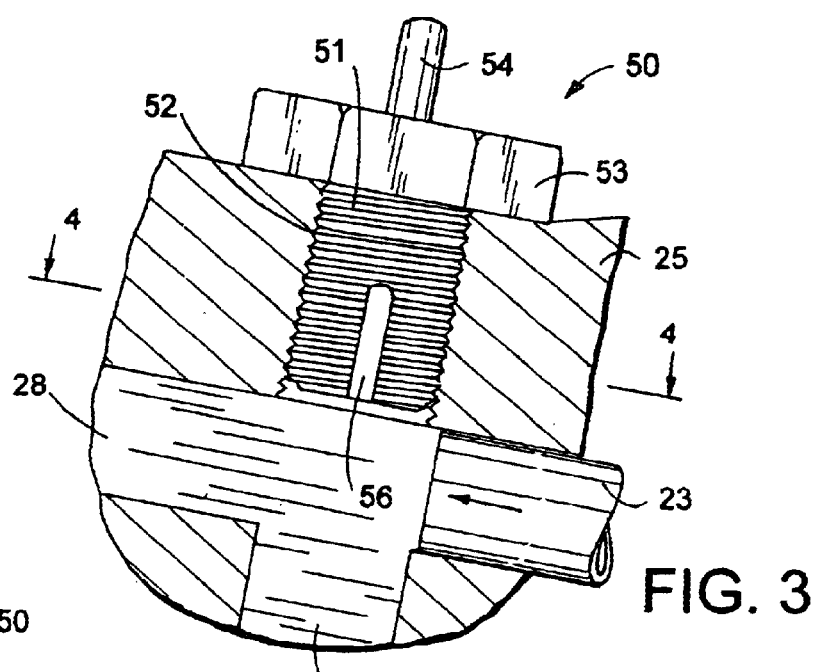
FIG. 3 is a sectional view of the air bleed valve of FIG. 2 in the closed position.
Figure 4:
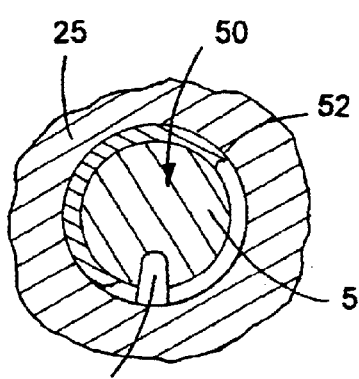
FIG. 4 is a sectional view taken along the line 4—4 of FIG. 3.
Figure 5:
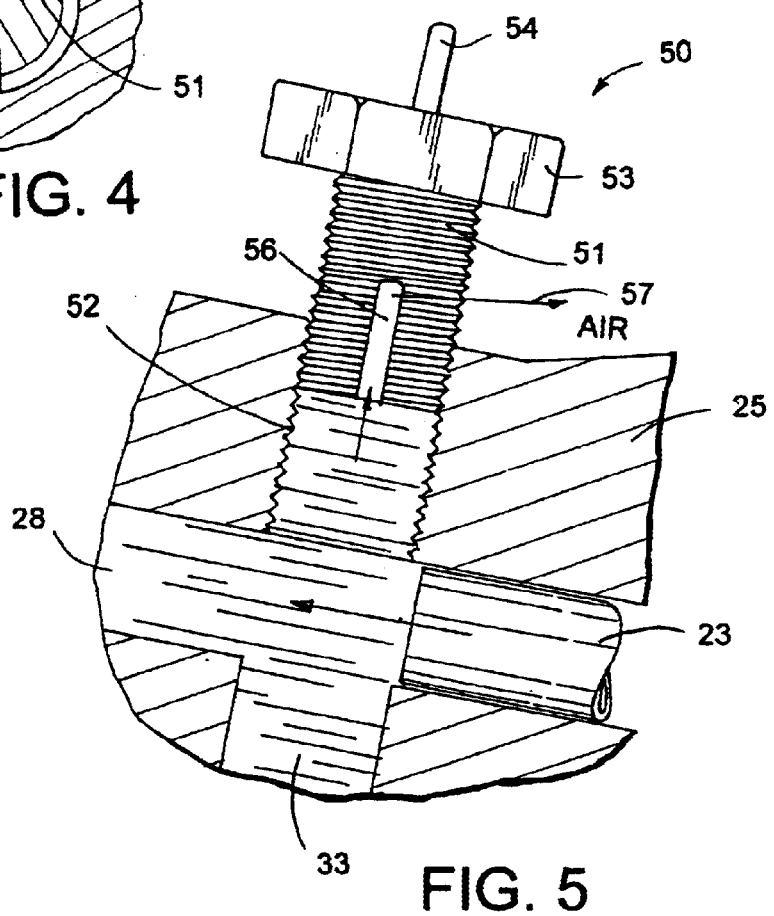
FIG. 5 is a sectional view similar to FIG. 3 showing the air bleed valve in the open position.

Referring to FIG. 2, grease gun 20 of the invention is equipped with an air bleed valve 50 mounted on top of body 25 in axial alignment with a grease supply passage 33 for allowing air to directly bleed out of passage or pumping chamber 28 and passage 33. As shown in FIGS. 3 to 5, valve 50 has a threaded stem 51 located in a threaded hole 52 in body 25. Hole 52 is in axial alignment with the longitudinal axis of passage 33. Stem 51 is joined to a head 53 having one or more ears 54. Ears 54 are finger grips used to turn valve 50 between open and closed positions. As shown in FIGS. 3–5, a liner groove 56 located in the outside of stem 51 extends about one-half of the length of stem 51. The inner end of groove 56 is open to the bottom of stem 51 and pumping chamber 28. FIG. 3 shows the valve 50 in the closed position with groove 56 within body 25. The head 53 engages body 25 to seal the outer end of hole 52 along with stem 51. Head 53 in engagement with body 25 prevents the inner end of stem 51 from projecting into pumping chamber 28 and interfering with the movement of plunger 23 into pumping chamber 28. When valve 50 is turned to the open position, shown in FIG. 5, groove 56 is open to pumping chamber 28 and atmosphere. Air in pumping chamber 28 and passage 33 bleeds out to atmosphere through groove 56, as shown by arrow 57. Grease replaces air in passage 33 and pumping chamber 28. Plunger 23 is effective to pump grease through pumping chamber 28 and check valve 35 into flexible tube 29. The connector 48 at the outer end of barrel 26 has a check valve 35, such as a ball check valve shown at 44 in U.S. Pat. No. 5,779,105, to prevent back flow of grease and air from tube 29 into pumping chamber 28. The check valve can be located in pumping chamber 28 downstream of plunger 23.

A modification of the air bleed valve for an air pressure operated grease gun is shown in FIGS. 6 to 10. The grease gun 20 is conventional grease gun that pumps grease with a power unit operated with a supply of air under pressure. Other types of power units, such as a hydraulic motor, an electric motor or a hand operated lever, can be used to operate the grease gun.

Figure 7:
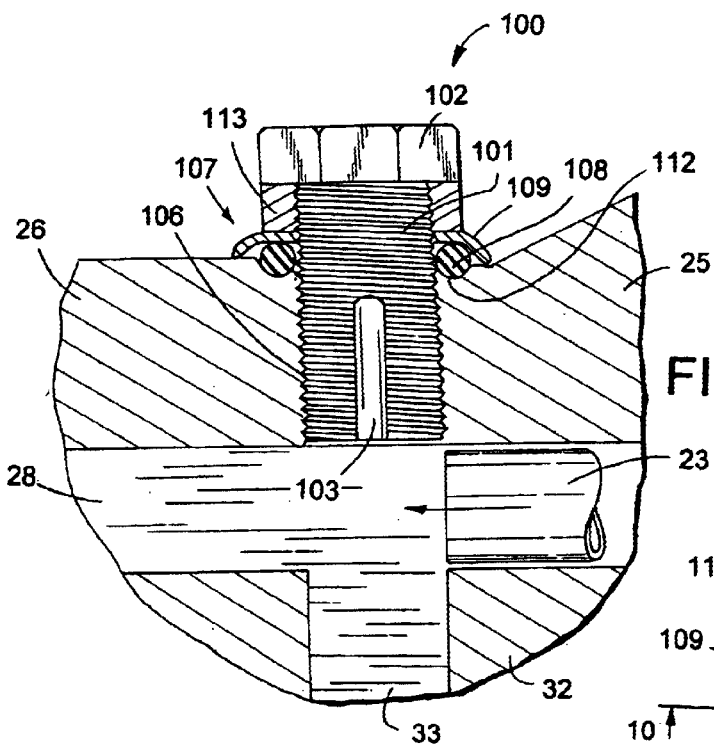
FIG. 7 is a sectional view of the air bleed valve of FIG. 2 in the closed position.
Figure 8:
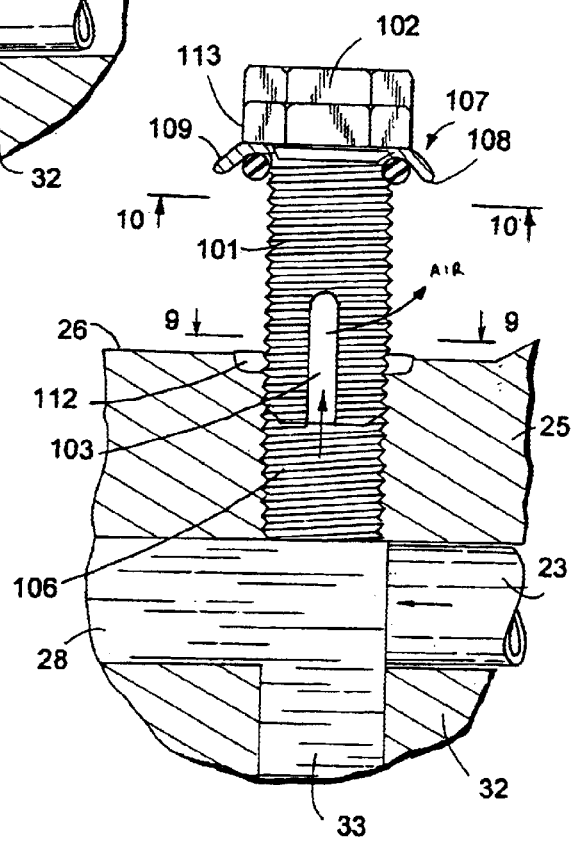
FIG. 8 is a sectional view of the air bleed valve of FIG. 2 in the open position.
Figure 9:
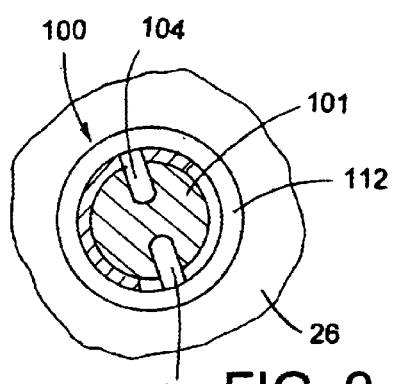
FIG. 9 is a sectional view taken along the line 9—9 of FIG. 8.
Figure 10:
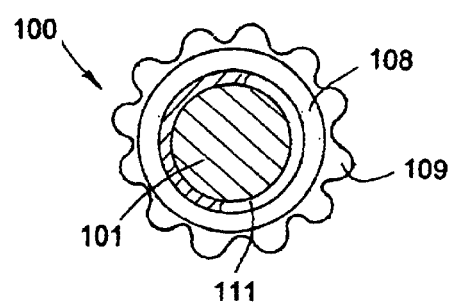
FIG. 10 is a sectional view taken along the line 10—10 of FIG. 8.

An air bleed valve, indicated generally at 100, is mounted on top of body 25 in axial alignment with the longitudinal axis of passage 33. The inner end of valve 100 is adjacent the forward end of plunger 23. The space in front of plunger 23 open to grease supply passage 33 normally collects air when a new grease tube 36 accommodating a grease cartridge is attached to base 32 of body 25. This air must be eliminated to allow plunger 23 to pump grease into pumping chamber 28, through the check valve 35 and into tube 29. Air bleed valve 100 has a thread stem 101 joined to a head 102. One or more ears can be attached to head 102 to facilitate turning of valve 100 to its open and closed positions. As shown in FIGS. 7, 8 and 9, a pair of axial extended grooves 103 and 104 are located in opposite sides of an inner portion of stem 101. Grooves 103 and 104 are linear passages to allow air to escape from pumping chamber 28 and passage 33 so that grease 38 freely flows from the grease cartridge through passage 33 into pumping chamber 28. Plunger 23 reciprocates to pump grease through pumping chamber 28 past check valve 35 into grease dispenser 29. Stem 101 has external threads cooperating with threads in a bore 106 open to pumping chamber 28 adjacent plunger 23. Bore 106 is in axial alignment with passage 33 so that air in passage 33 and pumping chamber 28 adjacent plunger 23 can be removed through grooves 103 and 104 in the stem 101 of bleed valve 100.

Figure 6:
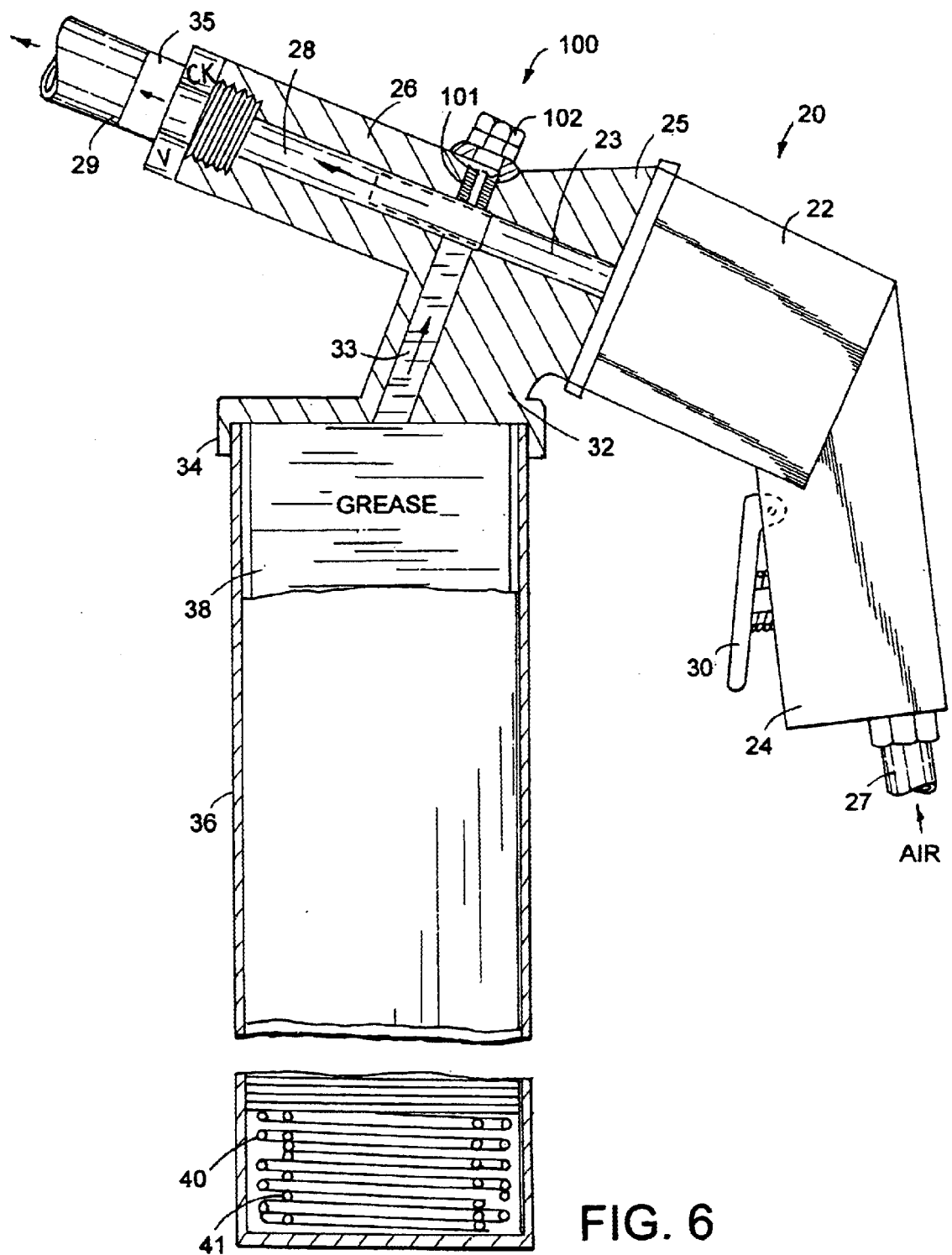
FIG. 6 is an air operated grease gun, partly sectioned, equipped with a modification of the air bleed valve of the invention.

A seal assembly 107 surrounding stem 101 engages the top of barrel 26 to prevent grease from escaping from bore 106 when valve 100 is closed, as shown in FIGS. 6 and 7. Seal assembly 107 has a rubber or plastic O-ring 108 and a lock washer 109. A circular ring 111 retains washer 109 on stem 101 adjacent a nut 113 threaded on stem 101. Washer 109 has outwardly directed fingers that engage the top of body 25 to inhibit rotation of O-ring relative to stem 101 during the opening and closing of the air bleed valve 100. Nut 113 locks washer 109 on barrel 26 and prevents accidental opening of the bleed valve 100 and unwanted discharge of grease.

When air bleed valve 100 is closed O-ring 108 fits in an annular groove or recess 112, as shown in FIG. 7. Grooves 103 and 104 are located in threaded bore 106 thereby blocking the flow of air and grease through grooves 103 and 104 to the external environment. When valve 100 is turned to the open position, shown in FIG. 8, grooves 103 and 104 are open to the external environment to allow air to flow from pumping chamber 28 and passage 33 to atmosphere. Grease replaces air in pumping chamber 28 and passage 33. Springs 40 and 41 apply pressure to the grease cartridge which causes grease 38 to fill the spaces in pumping chamber 28 and passage 33 as air flows out of the pumping chamber 28 and passage 33. When grease replaces the air in pumping chamber 28 and passage 33, valve 100 is closed. Stem 101 is turned to thread stem 101 into bore 106 to close valve 100. The head 102 and seal assembly 107 in engagement with body 25 prevents the inner end of stem 101 from entering the pumping chamber 28 and inhibit movement of plunger 23 into pumping chamber 28. Plunger 28 moved by the power unit pumps grease through passage 28 and check valve 35 into flexible tube 29. Connector 58 at the outer end of barrel 26 has a check valve 35 to prevent back flow of grease and air into passage 28. The check valve 35 can be located in pumping chamber 28 downstream from plunger 23. An example of a ball check valve in an outlet passage of a grease gun is disclosed by E. H. Scovell in U.S. Pat. No. 2,505,839.

There has been shown and described two embodiments of the grease gun with air bleed valves according to the invention. Changes in structures and arrangement of structure and materials and types of power units to operate the plungers can be made by a person skilled in the art without departing from the invention.

What is claimed is:

1. A grease gun having a body, a base joined to the body, a barrel joined to the body, a grease dispensing member connected to the barrel, an elongated grease pumping chamber located in said body and barrel, a grease supply passage in said base and body open to said pumping chamber to allow grease to flow into the pumping chamber, a check valve connected to said barrel to prevent grease and air from flowing back from the grease dispensing member into the pumping chamber, a plunger located in said grease pumping chamber, a power unit connected to said body and plunger operable to reciprocate the plunger in said pumping chamber to pump grease through said pumping chamber and check valve into the grease dispensing member, means mounted on the base for supplying grease to the grease supply passage, the improvement comprising: a threaded hole in said body aligned with the grease supply passage and open to the pumping chamber, a threaded stem located in said threaded hole, said stem having at least one linear side groove open to the pumping chamber, a head joined to said stem, said head and stem when rotated in one direction opens the side groove to atmosphere whereby air in the pumping chamber and grease supply passage is bled therefrom and replaced with grease, and said head and stem when rotated in a direction opposite the one direction closes the threaded hole, and an annular seal assembly surrounding said stem adjacent the head engageable with said body when the stem closes the threaded hole to prevent grease from flowing out of the threaded hole and air from flowing into the pumping chamber.

2. The grease gun of claim 1 including: a plurality of linear side grooves in said stem for allowing air to bleed from the pumping chamber and grease supply passage.

3. The grease gun of claim 1 wherein: said seal assembly comprises an O-ring and a washer surrounding said stem, said O-ring being located in sealing engagement with the body when the stem closes the threaded hole.

4. The grease gun of claim 3 wherein: the washer includes outwardly directed fingers that contact the body to inhibit rotation of the O-ring relative to the stem during turning of the stem.

5. The grease gun of claim 1 including: at least one ear joined to the head to facilitate turning of the stem and head.

6. A grease gun having a body, a base joined to the body, a barrel joined to the body, a grease dispensing member connected to the barrel, an elongated grease pumping chamber located in said body and barrel, a grease supply passage in said base and body open to said pumping chamber to allow grease to flow into the pumping chamber, a check valve connected to said barrel to prevent grease and air from flowing back from the grease dispensing member into the pumping chamber, a plunger located in said grease pumping chamber, a power unit connected to said body and plunger operable to reciprocate the plunger in said pumping chamber to pump grease through said pumping chamber and check valve into the grease dispensing member, means mounted on the base for supplying grease to the grease supply passage, the improvement comprising: a threaded hole in said body aligned with the grease supply passage and open to the pumping chamber, a threaded stem located in said threaded hole, said stem having an inner end adjacent the pumping chamber and an outer end joined to said head, said stem having at least one linear side groove open to the pumping chamber, said side groove extended from the inner end of the stem about halfway to the outer end thereof, and a head joined to said stem, said head and stem when rotated in one direction opens the side groove to atmosphere whereby air in the pumping chamber and grease supply passage is bled therefrom and replaced with grease, and said head and stem when rotated in a direction opposite the one direction closes the threaded hole to prevent grease from flowing out of the threaded hole and air from flowing into the pumping chamber.

7. The grease gun of claim 6 wherein: said stem has a plurality of side grooves, each of said side grooves extended from the inner end of the stem about halfway to the outer end thereof.

8. A grease gun having a body, a base joined to the body, a barrel joined to the body, a grease dispensing member connected to the barrel, an elongated grease pumping chamber located in said body and barrel, a grease supply passage in said base and body open to said pumping chamber to allow grease to flow into the pumping chamber, a check valve connected to said barrel to prevent grease and air from flowing back from the grease dispensing member into the pumping chamber, a plunger located in said grease pumping chamber, a power unit connected to said body and plunger operable to reciprocate the plunger in said pumping chamber to pump grease through said pumping chamber and check valve into the grease dispensing member, means mounted on the base for supplying grease to the grease supply passage, the improvement comprising: a threaded hole in said body open to the pumping chamber, a threaded stem located in said threaded hole, said stem having at least one side groove at one end thereof open to the pumping chamber and closed at the opposite end thereof, said stem when rotated in one direction opens the side groove to atmosphere whereby air in the pumping chamber and grease supply passage is bled therefrom and replaced with grease, said stem when rotated in a direction opposite the one direction closes the threaded hole, and an annular seal assembly surrounding said stem engageable with said body when the stem closes the threaded hole to prevent grease from flowing out of the threaded hole and air from flowing into the pumping chamber.

9. The grease gun of claim 8 including: a plurality of linear side grooves in said stem for allowing air to bleed from the pumping chamber and grease supply passage.

10. The grease gun of claim 8 including: said seal assembly comprises an O-ring and a washer surrounding said stem, said O-ring being located in sealing engagement with the body when the stem closes the threaded hole.

11. The grease gun of claim 10 wherein: the washer includes outwardly directed fingers that contact the body to inhibit rotation of the O-ring relative to the stem during turning of the stem.

12. The grease gun of claim 8 wherein: said stem has an inner end adjacent the pumping chamber and an outer end joined to said head, said side groove extended from the inner end of the stem about halfway to the outer end thereof.

13. The grease gun of claim 12 wherein: said stem has a plurality of side grooves, each of said side grooves extended from the inner end of the stem about halfway to the outer end thereof.

14. In a grease gun having a body, a grease dispensing member joined to the body, a grease pumping chamber located in the body, a grease supply passage in the body open to said pumping chamber to allow grease to flow into the pumping chamber, the improvement comprising: an air bleed valve mounted on the body in communication with said pumping chamber and in alignment with the grease supply passage, said valve having an open position to allow air to bleed from the pumping chamber and grease supply passage and a closed position, and a seal assembly cooperating with said valve and engageable with said body when the valve is in the closed position to prevent grease from flowing through the valve and air from flowing into the pumping chamber.

15. In a grease gun having a body, a grease dispensing member joined to the body, a grease pumping chamber located in the body, a grease supply passage in the body open to said pumping chamber to allow grease to flow into the pumping chamber, the improvement comprising: an air bleed valve mounted on the body in communication with said pumping chamber and in alignment with the grease supply passage, said valve having an open position to allow air to bleed from the pumping chamber and grease supply passage and a closed position to prevent grease from flowing through the valve and air from flowing into the pumping chamber, said valve having a threaded member having at least one passage open to the pumping chamber, and said body having a threaded hole aligned with the grease supply passage for accommodating the threaded member, said threaded member being selectively rotatable between open and closed positions to open the one passage to atmosphere to allow air to bleed from the pumping chamber and grease supply passage and to close the one passage, and an annular seal assembly surrounding said threaded member engageable with the body when the stem closes the threaded hole to prevent grease from flowing through the one passage and air from flowing through the one passage back into the pumping chamber.

16. The grease gun of claim 15 wherein: said passage in the threaded member is at least one side groove open to the pumping chamber for allowing air to bleed from the pumping chamber and grease supply passage.

17. The grease gun of claim 15 wherein: said seal assembly comprises an O-ring and a washer surrounding said threaded member, said O-ring being located in sealing engagement with the body when the threaded member closes the threaded hole.

18. The grease gun of claim 17 wherein: the washer includes outwardly directed fingers that contact the body to inhibit rotation of the O-ring relative to the threaded member during turning of the threaded member.

19. The grease gun of claim 15 wherein: said threaded member has an inner end adjacent the pumping chamber and an outer end joined to said head, said one passage comprising at least one side groove extended from the inner end of the threaded member about halfway to the outer end thereof.

20. The grease gun of claim 19 wherein: said threaded member has a plurality of side grooves, each of said side grooves extended from the inner end of the threaded member about halfway to the outer end thereof.

\* \* \* \* \*